US011164598B1

(12) United States Patent
Kashyap et al.

(10) Patent No.: US 11,164,598 B1
(45) Date of Patent: Nov. 2, 2021

(54) MANAGING DATA ASSOCIATED WITH OVERWRITTEN PORTIONS OF PREVIOUSLY-WRITTEN TRACKS

(71) Applicant: Seagate Technology LLC, Fremont, CA (US)

(72) Inventors: Anil Kashyap, Eden Prairie, MN (US); Jason Charles Jury, Apple Valley, MN (US); Joshua Ward Christensen, Savage, MN (US); Brian T. Edgar, Minneapolis, MN (US); Mark A. Gaertner, Vadnais Heights, MN (US)

(73) Assignee: SEAGATE TECHNOLOGY LLC, Fremont, CA (US)

( * ) Notice: Subject to any disclaimer, the term of this patent is extended or adjusted under 35 U.S.C. 154(b) by 0 days.

(21) Appl. No.: 17/218,317

(22) Filed: Mar. 31, 2021

(51) Int. Cl.
*G11B 5/09* (2006.01)
*G11B 5/012* (2006.01)
*G11B 20/10* (2006.01)

(52) U.S. Cl.
CPC ........ *G11B 5/012* (2013.01); *G11B 20/10388* (2013.01)

(58) Field of Classification Search
None
See application file for complete search history.

(56) References Cited

U.S. PATENT DOCUMENTS

| 6,950,378 | B1 * | 9/2005 | Miyazaki | G11B 7/126 369/47.52 |
|---|---|---|---|---|
| 9,099,155 | B1 | 8/2015 | Kataria et al. | |
| 9,236,087 | B1 | 1/2016 | Dahlberg | |
| 9,257,144 | B1 * | 2/2016 | Zhang | G11B 20/1217 |
| 9,304,930 | B2 | 4/2016 | Shu et al. | |
| 9,324,362 | B1 | 4/2016 | Gao et al. | |
| 9,378,763 | B1 | 6/2016 | Kim et al. | |
| 9,437,240 | B1 | 9/2016 | Haddock | |
| 9,495,988 | B1 | 11/2016 | Liu et al. | |
| 9,583,127 | B2 | 2/2017 | Qiang et al. | |
| 9,972,353 | B1 | 5/2018 | Qiang et al. | |

(Continued)

OTHER PUBLICATIONS

He, Weiping et al., "SMaRT: An Approach to Shingled Magnetic Recording Translation", usenix® The Advanced Computing Systems Association, https://www.usenix.org/conference/fast17/technical-sessions/presentation/he, ISBN 978-1-931971-36-2, 2017, 15 pages.

*Primary Examiner* — Peter Vincent Agustin
(74) *Attorney, Agent, or Firm* — Westman, Champlin & Koehler, P.A.

(57) ABSTRACT

A method includes writing first data on a first track of a data storage surface, and storing information for the first data in a memory other than the data storage surface. The method also includes performing a write operation on a second track of the data storage surface after the data is written on the first track. The second track is adjacent to the first track. The method further includes identifying potentially-overwritten sectors of the first track as a result of the performance of the write operation on the second track, and performing a first read operation on the identified potentially-overwritten sectors of the first track after completion of the write operation on the second track. Second data associated with the identified potentially-overwritten sectors is then stored in a solid-state memory, and mirrored to media.

20 Claims, 4 Drawing Sheets

(56) References Cited

U.S. PATENT DOCUMENTS

| | | |
|---|---|---|
| 9,978,417 B1 | 5/2018 | Qiang et al. |
| 9,978,421 B1* | 5/2018 | Nakata ............... G11B 7/00458 |
| 2005/0188153 A1* | 8/2005 | Yun ....................... G06F 3/0676 |
| | | 711/112 |
| 2005/0246591 A1* | 11/2005 | Johnson ............. G11B 20/1816 |
| | | 714/47.2 |
| 2010/0033869 A1* | 2/2010 | Oishi ..................... G11B 5/584 |
| | | 360/78.02 |
| 2012/0176698 A1 | 7/2012 | Rub |
| 2012/0300341 A1* | 11/2012 | Matsuo ............. G11B 20/1889 |
| | | 360/77.02 |
| 2013/0182348 A1* | 7/2013 | Kashiwagi ............... G11B 5/09 |
| | | 360/45 |
| 2017/0123944 A1* | 5/2017 | Macko ................ G06F 11/1076 |
| 2020/0090705 A1 | 3/2020 | Qiang et al. |

* cited by examiner

MANAGING DATA ASSOCIATED WITH OVERWRITTEN PORTIONS OF PREVIOUSLY-WRITTEN TRACKS

SUMMARY

In one embodiment, a method includes writing first data on a first track of a data storage surface, and storing information for the first data in a memory other than the data storage surface. The method also includes performing a write operation on a second track of the data storage surface after the data is written on the first track. The second track is adjacent to the first track. The method further includes identifying potentially-overwritten sectors of the first track as a result of the performance of the write operation on the second track, and performing a first read operation on the identified potentially-overwritten sectors of the first track after completion of the write operation on the second track. Second data associated with the identified potentially-overwritten sectors is then stored in a solid-state memory.

In another embodiment, a data storage device includes a data storage medium having a data storage surface, a head configured to interact with the data storage medium, and a controller communicatively coupled to the head. The controller is configured to direct the head to write first data on a first track of the data storage surface, and store information for the first data in a memory other than the data storage surface. The controller is also configured to direct the head to perform a write operation on a second track of the data storage surface after the data is written on the first track. The second track is adjacent to the first track. The controller is further configured to identify potentially-overwritten sectors of the first track as a result of the performance of the write operation on the second track, direct the head to perform a first read operation on the identified potentially-overwritten sectors of the first track after completion of the write operation on the second track, and store second data associated with the identified potentially-overwritten sectors in a solid-state memory.

In yet another embodiment, a method includes writing first data on a first track of a data storage surface, and storing information for the first data in a memory other than the data storage surface. The method also includes performing a write operation on a second track of the data storage surface after the data is written on the first track. The second track is adjacent to the first track. The method further includes identifying potentially-overwritten sectors of the first track as a result of the performance of the write operation on the second track, and performing one or more read operations on each of the identified potentially-overwritten sectors of the first track after completion of the write operation on the second track. Data associated with every sector of the identified potentially-overwritten sectors whose data is unrecoverable after a predetermined number of read operations is stored in a solid-state memory.

This summary is not intended to describe each disclosed embodiment or every implementation of managing data associated with overwritten portions of victim tracks as described herein. Many other novel advantages, features, and relationships will become apparent as this description proceeds. The figures and the description that follow more particularly exemplify illustrative embodiments.

DETAILED DESCRIPTION OF ILLUSTRATIVE EMBODIMENTS

Embodiments of the disclosure relate to techniques for increasing tracks per inch (TPI) in a data storage device (DSD) (e.g., a hard disc drive (HDD)) without compromising data integrity and without significantly impacting performance (e.g., input/output operations per second (IOPS)) of the DSD.

Due to an increase in TPI, portions of a previously-written first track are susceptible to being at least partially overwritten during a write operation to a second track that is adjacent to the first track. Embodiments of the disclosure relate to identifying the susceptible portions of the previously-written first track, and managing data from (or associated with) those portions in a manner that does not significantly impact performance (e.g., IOPS performance).

As will be described in detail further below, in embodiments of the disclosure, an off-track limit or threshold (used to determine when write faults (e.g., overwrites) may occur) together with a read after write (RAW) operation on the previously-written track or victim track to correct potential errors on the victim track allows TPI to be increased, and thus allows for an areal density capability (ADC) gain of, for example, 4-5% depending on the application. Maintaining the data (or metadata) for the victim track in memory enables an effective RAW operation. The data for the write faults on the victim track may be saved in a media cache with a copy mirrored in, for example, a dynamic random access memory (DRAM) of the HDD. This enables the HDD to get the ADC gains while meeting the performance benchmarks (IOPS and latency). The solution naturally applies to shingled magnetic recording (SMR) drives which have a limited number of active bands. In SMR, a band refers to a group of shingle tracks. When a read operation is carried out on a SMR band including the fault(s) (e.g., one or more sectors with faulty data), all data sectors other than the sectors with faulty data are read from the SMR band on the disc, and the unread data may be recovered from DRAM. The solution may also be used on conventional magnetic recording (CMR) drives, especially for specific applications (e.g., archive). Different embodiments are described below in connection with the figures.

Figure 1:
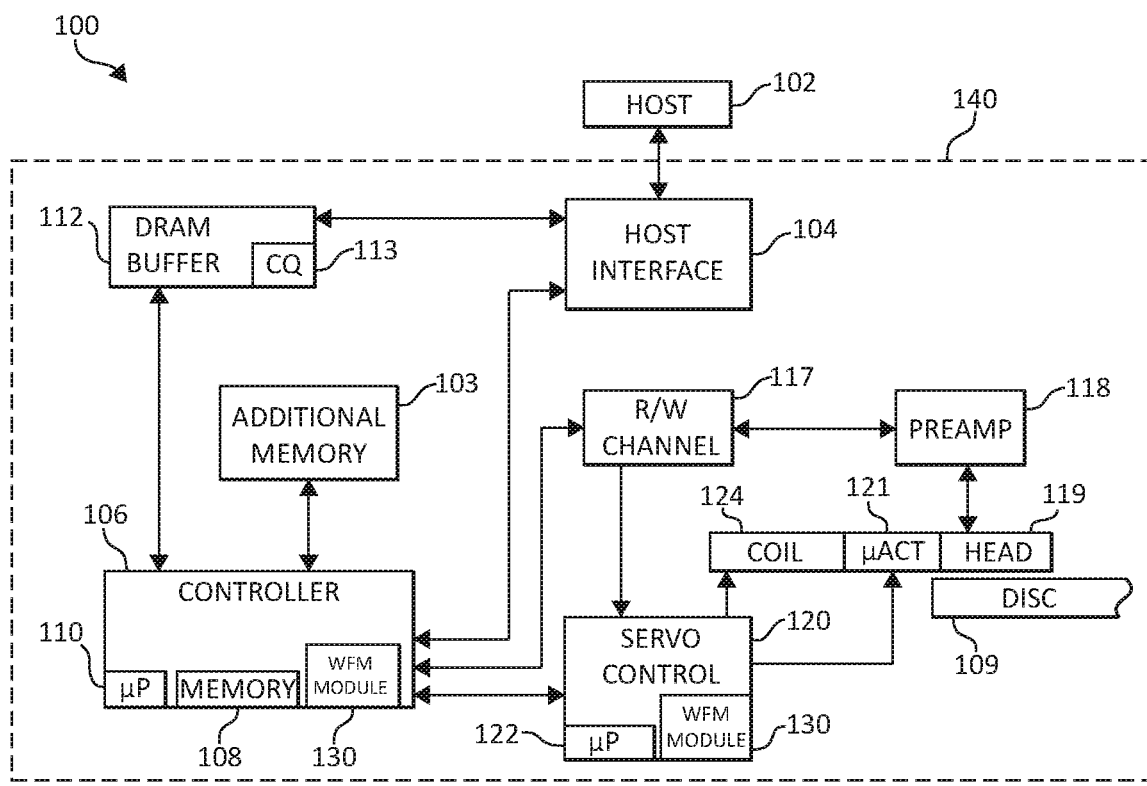
FIG. 1 is a diagrammatic illustration of a system in which write fault management in accordance with certain embodiments of the disclosure may be carried out.

FIG. 1 shows an illustrative operating environment in which certain specific embodiments disclosed herein may be incorporated. The operating environment shown in FIG. 1 is for illustration purposes only. Embodiments of the present disclosure are not limited to any particular operating environment such as the operating environment shown in FIG. 1. Embodiments of the present disclosure are illustratively practiced within any number of different types of operating environments.

It should be noted that like reference numerals may be used in different figures for same or similar elements. It should also be understood that the terminology used herein is for the purpose of describing embodiments, and the terminology is not intended to be limiting. Unless indicated otherwise, ordinal numbers (e.g., first, second, third, etc.) are used to distinguish or identify different elements or steps in a group of elements or steps, and do not supply a serial or numerical limitation on the elements or steps of the embodiments thereof. For example, "first," "second," and "third" elements or steps need not necessarily appear in that order, and the embodiments thereof need not necessarily be limited to three elements or steps. It should also be understood that, unless indicated otherwise, any labels such as "left," "right," "front," "back," "top," "bottom," "forward," "reverse," "clockwise," "counter clockwise," "up," "down," or other similar terms such as "upper," "lower," "aft," "fore," "vertical," "horizontal," "proximal," "distal," "intermediate" and the like are used for convenience and are not intended to imply, for example, any particular fixed location, orientation, or direction. Instead, such labels are used to reflect, for example, relative location, orientation, or directions. It should also be understood that the singular forms of "a," "an," and "the" include plural references unless the context clearly dictates otherwise.

It will be understood that, when an element is referred to as being "connected," "coupled," or "attached" to another element, it can be directly connected, coupled or attached to the other element, or it can be indirectly connected, coupled, or attached to the other element where intervening or intermediate elements may be present. In contrast, if an element is referred to as being "directly connected," "directly coupled" or "directly attached" to another element, there are no intervening elements present. Drawings illustrating direct connections, couplings or attachments between elements also include embodiments, in which the elements are indirectly connected, coupled or attached to each other.

FIG. 1 is a diagrammatic illustration of a system in which write fault management (WFM) in accordance with certain embodiments of the present disclosure may be carried out. Specifically, FIG. 1 provides a simplified block diagram of a DSD 100. The DSD 100 may be coupled to a host 102 and may service commands from the host 102. The host 102 may also be referred to as the host system, host device or host computer. The host 102 can be a desktop computer, a laptop computer, a server, a tablet computer, a telephone, a music player, another electronic device, or any combination thereof. The DSD 100 can communicate with the host device 102 via a hardware or firmware-based interface 104. The interface 104 may comprise any interface that allows communication between a host 102 and a DSD 100, either wired or wireless, such as USB, IEEE 1394, Compact Flash, SATA, eSATA, PATA, SCSI, SAS, PCIe, Fibre Channel, Ethernet, or Thunderbolt, among others. The interface 104 may include a connector (not shown) that allows the DSD 100 to be physically removed from the host 102. In some embodiments, the DSD 100 may have a casing 140 housing the components of the DSD 100, or the components of the DSD 100 may be attached to the housing 140, or a combination thereof.

DSD 100 can include a buffer (e.g., a DRAM buffer) 112 and a programmable controller 106. Buffer 112 can temporarily store data during read and write operations, and can include a command queue (CQ) 113 where multiple pending operations can be temporarily stored pending execution. Commands arriving over the interface 104 may automatically be received in the CQ 113 or may be stored there by controller 106, interface 104, or another component.

Programmable controller 106 can include associated memory 108 and processor 110. In some embodiments, the DSD 100 can include a read-write (R/W) channel 117, which can encode data during write operations and reconstruct user data retrieved from a memory, such as disc(s) 109, during read operations. A preamplifier circuit (preamp) 118 can apply write currents to one or more heads 119 and provides pre-amplification of read-back signals. A servo control circuit 120 may use servo data to provide the appropriate current to a coil 124, sometimes called a voice coil motor (VCM), to position the head(s) 119 over a desired area of the disc(s) 109. The controller 106 can communicate with a processor 122 to move the head(s) 119 to the desired locations on the disc(s) 109 during execution of various pending commands in the CQ 113.

In some embodiments, the DSD 100 may include solid state memory instead of or in addition to disc memory. For example, the DSD 100 can include an additional memory 103, which can be either volatile memory such as DRAM or SRAM, or nonvolatile memory, such as NAND Flash memory. The additional memory 103 can function as a cache and store recently or frequently read or written data, or data likely to be read soon. Additional memory 103 may also function as main storage instead of or in addition to disc(s) 109. A DSD 100 containing multiple types of nonvolatile storage media, such as a disc(s) 109 and Flash memory 103, may be referred to as a hybrid storage device.

To read or write data to a storage medium such as disc(s) 109, DSD 100 may employ servo data to properly position head 119 over a desired track. Servo data used to identify a head's location over a disc may be recorded onto disc(s) 109, interspersed between user data. Servo data may be read from disc(s) 109 by head 119 as the disc(s) 109 spin and the head 119 position is adjusted. The read servo data may be provided to preamp circuit 118. The preamp circuit 118 may preamplify and filter the readback signals from the transducer head 119, and provide the processed servo data to read/write channel 117. The R/W channel 117 can detect and condition the servo data, including application of automatic gain control and conversion of the signals to digital form.

Servo control 120 can process the digitized servo data to generate a current command signal. The command signal may be used to apply the appropriate current to the coil 124 to position the transducer 119 over the disc(s) 109. The servo data may be used to determine a current track location of the head 119, and calculate adjustments to move to a target track, which may be called track seeking. Once the head 119 is over a desired track, the servo data may be used to maintain the head's position over the track during read or write operations, which may be called track following.

In certain embodiments, to attain fine position control of the head 119 relative to a selected data track, a head stack assembly (HSA) can include a micro-actuator (µACT) 121 (which may also be referred to as a secondary actuator motor) supported by a load arm. The micro-actuator 121 can include a bipolar piezoelectric transducer that responds to positive voltage inputs by expanding in a predetermined direction, while contracting in the predetermined direction to application of a negative voltage. As the micro-actuator 121 can be affixed to a load arm of a HSA, changes in mechanical position of the micro-actuator relative to the selected data track results in changes in mechanical position of the head 119 relative to the selected data track of the disc 109, thereby facilitating fine position control of the head 119 relative to the selected data track.

Due to various influences, a head 119 may not perfectly follow a target track, which may lead to track misregistration (TMR) which can involve misalignments of the head 119 with a given track. The servo data may include burst signals, which may be called position error signal (PES) bursts. The PES bursts may be used to determine a PES value, representing an offset between a head's 119 current position and the track center. If a head 119 deviates too far from a desired track center during a write operation such that the off-track threshold is exceeded, a write fault may be declared by a write fault management (WFM) module 130.

The WFM module 130 may be a processor, controller, or other circuit, or it may be a set of software instructions that, when executed by a processing device, perform the functions of the WFM module 130. In some embodiments, the WFM module 130 may be part of or executed by controller 106, and/or part of or executed by servo control circuit 120. As noted above, an off-track limit or threshold (used to determine when write faults (e.g., overwrites) may occur) together with a RAW operation on the previously-written track or victim track to correct potential errors on the victim track allows TPI to be pushed higher. WFM module 130 may use the PES value of a first track (e.g., the previously-written track) to set a write fault threshold or off-track threshold value of a second track (e.g., the currently-written track). The WFM module 130 may utilize the off-threshold(s) to identify the potential errors on the victim track, and then initiate RAW operations to correct the potential errors on the victim tracks. Data (or metadata) for the victim track stored in memory (e.g., in buffer 112) enables an effective RAW operation. With the help of WFM module 130, the data for the write faults (or RAW faults) on the victim track may be saved in a media cache (e.g., a cache on data storage media (e.g., disc(s) 109) and a copy of the RAW fault data may be mirrored in, for example, a portion of DRAM 112. Details regarding RAW fault management in accordance with embodiments of the disclosure are provided further below. Write fault identification is first described below in connection with FIGS. 2A and 2B.

Figure 2:
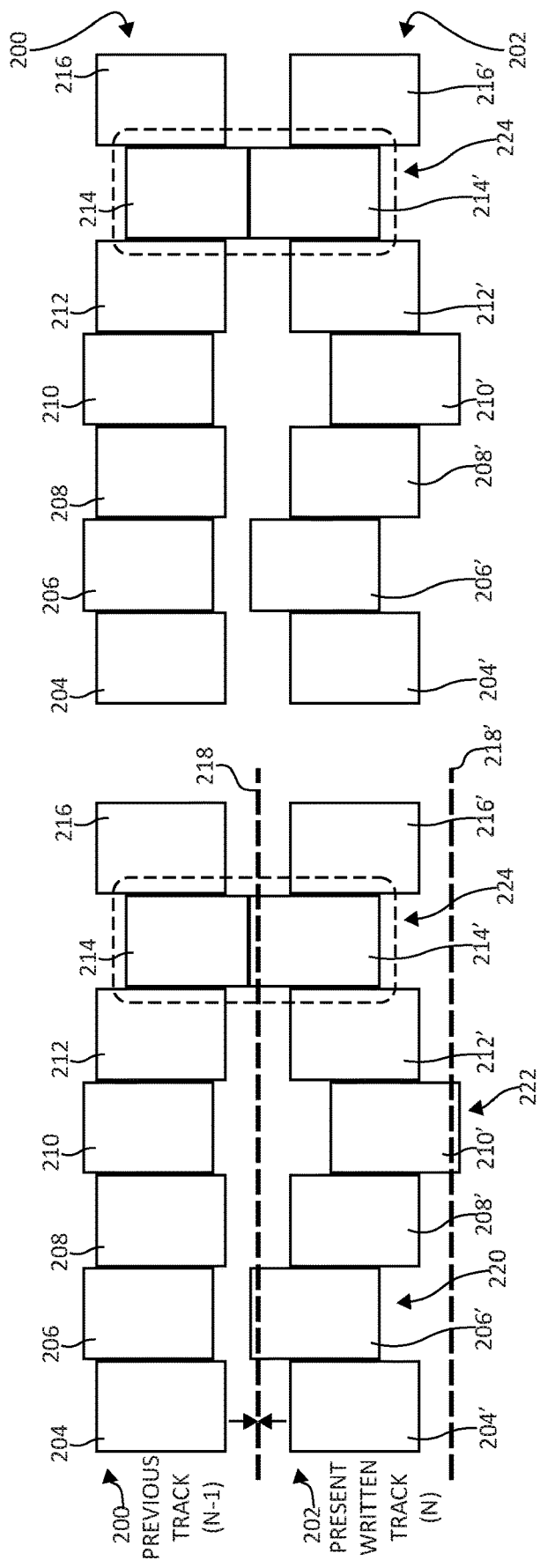
FIG. 2A is a diagrammatic illustration of a first write fault identification technique.
FIG. 2B is a diagrammatic illustration of a second write fault identification technique.

FIGS. 2A and 2B illustrate sector write fault identification in adjacent tracks. Both FIGS. 2A and 2B illustrate portions of a previously-written track (N–1)) 200 and a currently-written track (N) 202. Previously-written track portion 200 includes data blocks 204-216 written to 7 consecutive sectors, and currently-written track portion 202 includes data blocks 204'-216' written to 7 consecutive sectors. FIG. 2A includes off-track thresholds 218 and 218' on either side of currently-written track portion 202. Since, in FIG. 2A, a single off-track threshold 218, 218' is used on each side of the track (e.g., either side of track 202) for all sectors, a write fault is identified whenever a data block written in a sector overlaps an off-track threshold 218, 218'. In other words, in the fault-identification techniques of FIG. 2A, a write fault is detected at a particular sector i whenever the modulus of the PES at that sector is greater than the off-track threshold 218, 218' (e.g., |PES(i)|>off-track threshold at 220, 222 and 224).

FIG. 2B illustrates a fault-identification technique in which off-track thresholds or PES "squeeze" are dynamically determined. In this technique, two tracks worth of PES may be maintained (in, for example, memory 103 of FIG. 1). One track of PES represents the previously-written track 200, and the other track of PES represents the currently-written track 202. This allows for adjacent track PES squeeze to be dynamically calculated. In this technique, PES directions are taken into account during sector writes, and therefore write faults are determined when sector PES values for the previously-written track 200 and the currently-written track 202 are actually indicative of a substantial likelihood of write overlap as shown at 224. Thus, 220 and 222 of FIG. 2A do not identify as write faults in FIG. 2B.

Figure 3:
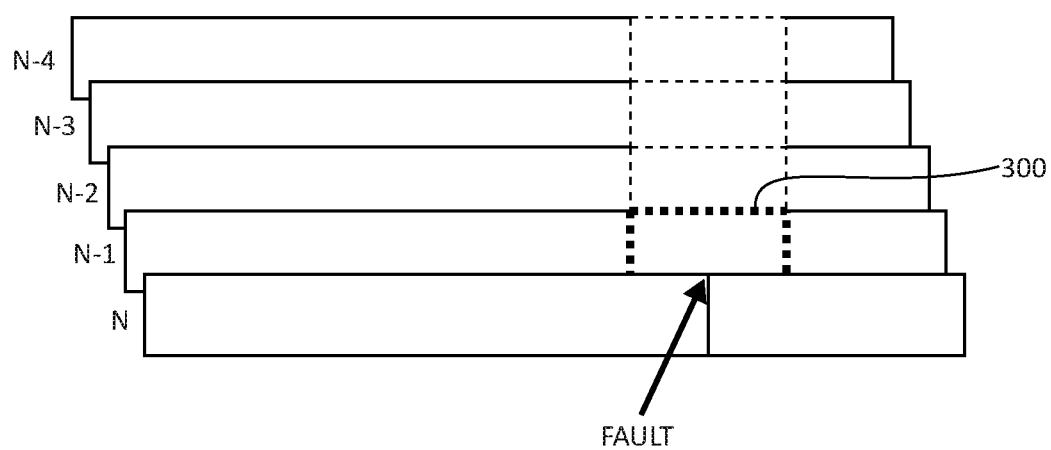
FIG. 3 is a diagrammatic illustration showing an example sector that is impacted by an overwrite.

In embodiments of the disclosure, a RAW operation is triggered (by, for example, WFM module 130 of FIG. 1) when the encroachment is greater than an off-track threshold. It should be noted that the impacted sector(s) on the victim (N–1) track may be refreshed in place during/after the RAW operation. However, in SMR, a RAW refresh in place introduces the risk of cascading writes to the beginning of the band. FIG. 3 is a diagrammatic illustration showing an example sector 300, which is impacted by an overwrite. In the example of FIG. 3, the refresh on track N–1 may cause encroachment on track N–2 which may entail refreshing track N–2 and so forth (e.g., N–3, N–4, etc.). The multiple disc revolutions that may be employed for the RAW refresh may introduce command completion time (CCT) and IOPS risks. Accordingly, instead of refreshing data in place, the data for the at-risk sectors (RAW faults) can be staged to media cache (e.g., a cache on disc(s) 109 of FIG. 1). This avoids the cascading write issue. The media cache writes can be carried out with a minimal impact to performance. To ensure that data can be recovered from the victim track in case of severe encroachment (PES overshoot), data/metadata for the previously-written track (N–1 track) may by retained in memory (e.g., in DRAM buffer 112 of FIG. 1). In host-managed SMR applications, for example, the number of active bands is limited to a small number (e.g., 16 or less). For such applications, data for the entire active previously-written track(s) may be maintained in DRAM (e.g., in DRAM buffer 112 of FIG. 1). Another option may be to retain powerful error correction codes (inner and/or outer codes) for the previously-written track(s) in DRAM (e.g., in DRAM buffer 112 of FIG. 1). This allows the data for a much larger number of active bands to be saved.

As noted above, the RAW operation is triggered when the encroachment is greater than an off-track threshold. In some embodiments, an off-track warning system may also be employed. In such embodiments, an off-track warning condition may by triggered when a head currently writing to a track deviates from a center of that track. The off-track warning condition may be severe enough to where further writing to a current sector carries some risk. At that level of severity, writing to the sector may immediately be stopped, and subsequent operations (e.g., write fault management) for the currently-written track and any victim track(s) may be carried out a manner described above in connection with RAW faults. However, under a less severe off-track warning level, the write operation may be allowed to continue until a write signal end boundary of the sector being currently written is reached. Thereafter, an integrity of any data written form a beginning of the sector to the write signal end boundary of the sector may be verified by carrying out a read operation on the sector. Data in corresponding sectors of any adjacent previously-written tracks may also be verified (e.g., by carrying out read operations on those sectors). If the content of the previously-written or victim track(s) and the track being written is determined good/valid, then the writing until the write signal end boundary of the sector of the currently-written track and the writing in corresponding sectors of the adjacent previously-written tacks need not be revisited/retried. This is an advantage because retries carry the risk of further victimizing the victim track(s) potentially to the point of needing the re-vectoring mechanism described above in connection with the RAW faults.

Figure 4:
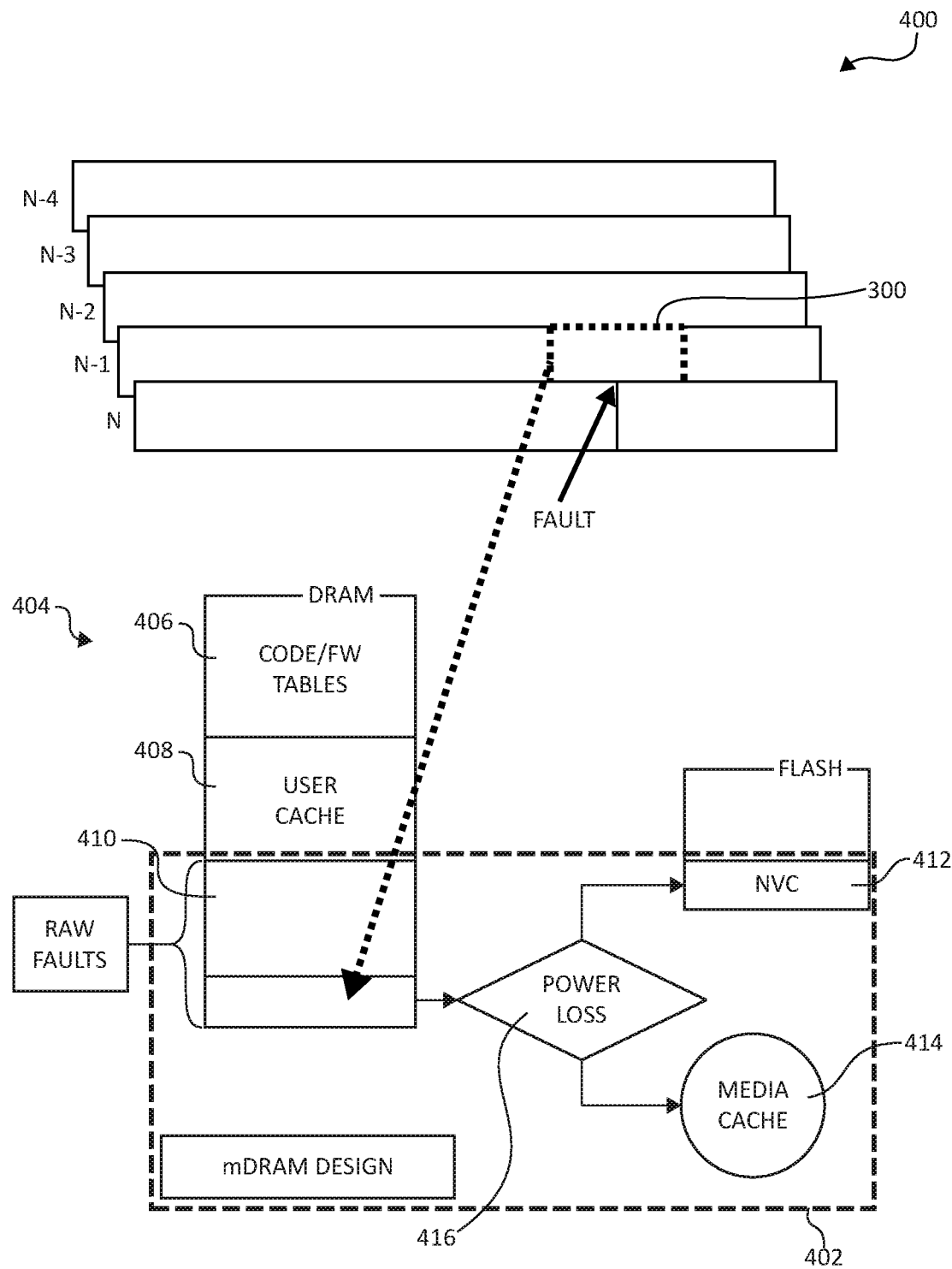
FIG. 4 is a diagrammatic illustration of a data storage device portion that employs mirrored dynamic random access memory for read after write faults in accordance with one embodiment.

FIG. 4 is a diagrammatic illustration of a DSD portion 400 that employs mirrored DRAM (mDRAM) 402 for RAW faults in accordance with one embodiment. DSD portion 400 includes DRAM 404, which may be DRAM buffer 112 of FIG. 1 in one embodiment. In the embodiment of FIG. 4, DRAM 404 is divided into three portions, with each different portion configured to store different data/code. A first portion 406 is employed to store firmware code, a second portion 408 is employed as a cache for user data, and a third portion 410 is a part of the mDRAM 402. Also included in mDRAM 402 are a non-volatile cache (NVC) 412, which may include Flash memory, and a media cache 414. In one embodiment, NVC 412 may be additional memory 103 of FIG. 1, and media cache 414 may be included on disc(s) 109 of FIG. 1. RAW faults (such as RAW fault 300 described above in connection with FIG. 3) are saved to the NVC protected area 412 in DRAM 400. The active segment (which may be, for example, ~1 megabyte (MB)) being written is saved to Flash 412 in case of power loss determined at 416. When the active segment fills, it is saved to media cache 414. As noted above, section 410 of the DRAM 404 is set aside to maintain the data for the RAW faults. For example, in a 256 MB DRAM, ~100 MB can be allocated for saving the RAW faults. This avoids an issue with read fragmentation when the data at the fault locations is to be read. There may be no cleaning from the RAW mirrored data. When a write pointer for a band is reset, the corresponding data for that band is released. If the RAW fault rate is low enough, the data for all the impacted sectors may be maintained in DRAM 404. If the rate of RAW faults is high, so that it overflows the DRAM 404 allocation (e.g., DRAM portion 410), the oldest data is overwritten. However, a copy of the overwritten data may still be maintained on media (e.g., on disc(s) 109 of FIG. 1)). There will be a performance penalty if the RAW data on the media is to be read by the host (e.g., 102 of FIG. 1). Another option may be to save the data for RAW fault sectors to NAND Flash.

As indicated earlier, the above-described WFM techniques may also be used in CMR drives, especially for specific applications (e.g., archive). In certain embodiments of WFM for CMR, PES information for all tracks in the DSD may be saved in either Flash memory or on media. The PES information for track N−1 may be retrieved prior to writing track N. Outer codes may be maintained on all write accesses using a read-modify-update scheme. When a write is received in the middle of a track, all the data on the track is read so that a valid outer code can be generated with the new write. The new outer code is then written at the end of the track as part of the write operation or in the background.

The WFM for CRM scheme described above may have a significant performance impact for a workload with pure random writes across a full DSD (e.g., HDD) partition. However, for specific applications, and some real-life workloads, the performance impact may be better. For example, for an archive application, if the writes arrive sequentially at a few limited locations, the PES information and the outer codes can be maintained with limited performance impact. The PES information for a large group of tracks may be read in one disc access and kept in memory. The outer codes for the tracks with the active writes may be maintained in memory and dropped at the end of the track for full outer code protection.

Real-life workloads show a high degree of locality for writes. The performance impact of the PES reads and outer-code updates can be minimized by batching these operations. For workloads that have a high degree of temporal locality, the PES information for the active track areas may be kept in memory. This would limit the performance impact of reading the PES data from the disc. The writes may be staged through a media cache. This enables the outer codes to be built in a more efficient manner when the data is being cleaned from the media-cache to the main-store.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to limit the scope of this application to any particular embodiment or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments include more features than are expressly recited in each claim. Rather, as the following claims reflect, inventive subject matter may be directed to less than all of the features of any of the disclosed embodiments.

The above-disclosed subject matter is to be considered illustrative, and not restrictive, and the appended claims are intended to cover all such modifications, enhancements, and other embodiments, which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method comprising:
   writing first data on a first track of a data storage surface;
   storing information for the first data in a memory other than the data storage surface;
   performing a write operation on a second track of the data storage surface after the data is written on the first track, the second track being adjacent to the first track;
   identifying potentially-overwritten sectors of the first track as a result of the performance of the write operation on the second track;
   performing a first read operation on the identified potentially-overwritten sectors of the first track after completion of the write operation on the second track; and storing second data associated with the identified potentially-overwritten sectors in a solid-state memory.

2. The method of claim 1 and further comprising storing a copy of the second data in a media cache.

3. The method of claim 1 and wherein storing the second data in the solid-state memory comprises storing the second data in a dynamic random access memory (DRAM).

4. The method of claim 3 and further comprising providing power-loss protection for the second data when it is being stored in the DRAM.

5. The method of claim 1 and wherein identifying the potentially-overwritten sectors comprises comparing head position error signals when writing sectors of the first track with one or more off-track thresholds.

6. The method of claim 1 and wherein the first track and the second track are written using a shingled magnetic recording (SMR) technique.

7. The method of claim 1 and further comprising performing a second read operation to obtain the first data, the second read operation comprising:
reading data in sectors other than the identified potentially-overwritten sectors from the first track, and
reading the data associated with the identified potentially-overwritten sectors from the solid-state memory.

8. The method of claim 1 and wherein storing information for the first data in the memory other than the data storage surface comprises:
storing a copy of the first data in the memory other than the data storage surface; or
storing outer codes associated with the first data in the memory other than the data storage surface.

9. The method of claim 1 and further comprising:
detecting an off-track warning condition during the write operation on the second track;
when the detected off-track warning condition is below a predetermined level of severity, continuing the write operation on the second track until a write signal end boundary of a sector being currently written is reached; and
verifying an integrity of any data written form a beginning of the sector to the write signal end boundary of the sector.

10. A data storage device comprising:
a data storage medium having a data storage surface;
a head configured to interact with the data storage medium;
a controller communicatively coupled to the head, the controller configured to:
direct the head to write first data on a first track of the data storage surface;
store information for the first data in a memory other than the data storage surface;
direct the head to perform a write operation on a second track of the data storage surface after the data is written on the first track, the second track being adjacent to the first track;
identify potentially-overwritten sectors of the first track as a result of the performance of the write operation on the second track;
perform a first read operation on the identified potentially-overwritten sectors of the first track after completion of the write operation on the second track; and
store second data associated with the identified potentially-overwritten sectors in a solid-state memory.

11. The data storage device of claim 10 and wherein the controller is further configured to direct the head to store a copy of the second data in a media cache.

12. The data storage device of claim 10 and further comprising a dynamic random access memory (DRAM), the DRAM being the solid-state memory into which the controller is configured to store the second data.

13. The data storage device of claim 12 and further comprising a non-volatile solid-state cache memory that is configured to provide power loss protection for data being stored in the DRAM when a power loss occurs.

14. The data storage device of claim 10 and wherein the controller is configured to identify the potentially-overwritten sectors by comparing position error signals from the head when writing sectors of the first track with one or more off-track thresholds.

15. The data storage device of claim 10 and wherein the controller further configured to direct the head to write the first track and the second track using a shingled magnetic recording (SMR) technique.

16. The data storage device of claim 10 and wherein the controller is further configured to perform a second read operation to obtain the first data by:
directing the head to read data in sectors other than the identified potentially-overwritten sectors from the first track, and
reading the data associated with the identified potentially-overwritten sectors from the solid-state memory.

17. The data storage device of claim 10 and wherein the controller is configured to store a copy of the first data in the memory other than the data storage surface.

18. The data storage device of claim 10 and wherein the controller is configured to store outer codes associated with the first data in the memory other than the data storage surface.

19. A method comprising:
writing first data on a first track of a data storage surface;
storing information for the first data in a memory other than the data storage surface;
performing a write operation on a second track of the data storage surface after the data is written on the first track, the second track being adjacent to the first track;
identifying potentially-overwritten sectors of the first track as a result of the performance of the write operation on the second track;
performing one or more read operations on each of the identified potentially-overwritten sectors of the first track after completion of the write operation on the second track; and
storing second data associated with every sector of the identified potentially-overwritten sectors whose data is unrecoverable after a predetermined number of read operations in a solid-state memory.

20. The method of claim 19 and further comprising storing a copy of the second data in a media cache.

* * * * *